United States Patent [19]

Mentz

[11] 4,318,871
[45] Mar. 9, 1982

[54] MOUNTING RING CONSTRUCTION FOR SURFACE AERATOR APPARATUS

[76] Inventor: H. C. Mentz, 1002 W. Nine Mile Rd., Highland Springs, Va. 23075

[21] Appl. No.: 123,840

[22] Filed: Feb. 22, 1980

[51] Int. Cl.³ .............................. B01F 3/04; C02F 1/74
[52] U.S. Cl. ...................................... 261/120; 261/91; 210/242.2
[58] Field of Search ............. 261/91, 120; 210/242 R, 210/242 A, ; 415/7, 500; 416/85; 239/16, 22, 23

[56] References Cited

U.S. PATENT DOCUMENTS

| | | | |
|---|---|---|---|
| 2,117,411 | 5/1938 | Erbach | 261/91 |
| 3,416,729 | 12/1968 | Ravitts et al. | 261/120 |
| 3,462,132 | 8/1969 | Kaelin | 415/7 |
| 3,572,658 | 3/1971 | Ravitts | 261/120 |
| 3,871,581 | 3/1975 | Dively | 261/91 |

OTHER PUBLICATIONS

"Surfators: Mechanical Surface Aeration by Ashbrook", Ashbrook Corp.; 6916 Harwin Dr., P.O. Box 36218, Houston Tx. 77036.

*Primary Examiner*—Gregory N. Clements
*Attorney, Agent, or Firm*—Larson and Taylor

[57] ABSTRACT

A surface aerator is provided which includes a float, a throat or draft tube supported by the float and forming a float unit therewith, a power module including a motor and a propeller which is driven by the motor and is disposed within the throat of the float unit, and a mounting ring construction for mounting the power module in spaced relationship above the float unit. The mounting ring construction includes upper and lower rings joined together by a series of upstanding rods. The upper ring is bolted to the power module by bolts which extend into the rods and the lower ring is bolted to the float unit by bolts which extend through circumferentially spaced apertures in the lower ring.

10 Claims, 4 Drawing Figures

MOUNTING RING CONSTRUCTION FOR SURFACE AERATOR APPARATUS

FIELD OF THE INVENTION

The invention relates to surface aerator apparatus comprising a float unit and a power module mounted above the float unit and more particularly, to an improved mounting arrangement for the power module of such apparatus.

BACKGROUND OF THE INVENTION

In floating aerator apparatus of the type referred to above, liquid from the body of liquid to be aerated is pumped up through a throat section or draft tube of the float unit by the power module, the latter generally including an electric motor which is powered from the shore through a connecting cable. The motor is often disposed upon a specially shaped, generally conical deflector or diffuser section which guides the movement of the liquid drawn up through the throat section by an impeller or propeller driven through a drive shaft driven by the motor, although this deflector design is dispensed with in other constructions. In all floating aerators of the type with which the invention is concerned, the power module must be mounted in spaced relationship to the float unit so as to permit the liquid drawn up through the throat section to be discharged between the power module and the float unit, the discharge generally taking place laterally around the periphery of the power module. To this end, a series of circumferentially disposed mounting bolts or studs are provided which serve to space the power module from the float unit and define open areas therebetween through which the discharge can take place.

It has been found that over the years the single most important cause of failure in surface aerators has to do with construction of the mounting or attachment arrangement for the power module described above. These constructions generally utilize shoulder bolts or what is known as single stud mounting arrangements. In the latter, four or more studs are screwed into the float unit and the power module is suspended above the float unit on these studs. The torque produced by the motor, which is particularly strong during starting or where heavy debris is being pumped through the throat, tends to turn the entire unit in a circle. However, because the float unit is relatively stationary, this turning force is resisted. Hence, the torque generated is transferred to the weakest point in the overall system and this point is the mounting studs. Because of this torque, the studs are eventually loosened and the power module is thus caused to lean far enough to one side that the propeller begins hitting the inner walls of the throat section of the float unit. At this point, some of the studs usually break and the power module falls to one side, in many cases causing the motor to burn out. The problem has been and continues to be a very costly one, with even the minimum expense for repairs being very substantial.

Although there are a number of different constructions and arrangements for mounting the power module of a floating aerator, all generally suffer the disadvantages discussed above and thus provide a weak link in the overall unit which ultimately results in damage to the aerator, with substantial attendant downtime and consequent expensive repairs. Some further examples of the mounting arrangements used in the prior art are those illustrated and described in U.S. Pat. Nos. 3,572,658 (Ravitts); 3,669,422 (Nogaj); 3,836,130 (Earhart et al); and 3,911,065 (Martin et al).

SUMMARY OF THE INVENTION

In accordance with the invention, a floating aerator device is provided having an improved mounting arrangement for the power module. The mounting arrangement provides a firm, stable base upon which the power module rests and a firm base for attachment to the float unit. Because of the strength and stability of the mounting arrangement, the starting torque of the motor of the power module is taken up through the thrust bearings in the motor which are designed for this purpose. This contrasts with the prior art wherein, as described above, the mounting arrangement constitutes a weak point in the unit, and thus the torque generated by the motor upon starting is exerted at that point.

According to a preferred embodiment of the invention, a mounting construction is provided which comprises first and second rings or annular plates which are joined together by upright rods, such as by welding, to form an integral assembly. The upper ring is connected to the power module while the lower ring is connected to the float unit. The upper ring is preferably attached by means of bolts which extend downwardly into the rods and the heads of which are made flush with the surface of the power module. The lower ring is bolted to the float unit by bolts which extend through circumferentially spaced holes. The lower ring is received in a recess in the fiberglass of the float unit and suitably encapsulated so as to eliminate any obstruction and thereby preserve the shaping of the discharge surface of the float unit. A mounting ring may be disposed beneath the lower ring for receiving the bolts and thereby adding stability to the construction.

Other advantages of the invention include the elimination of single studs which can loosen and/or break, the elimination of nuts which can vibrate free, and the elimination of alignment problems associated with the use of individual studs or bolts. Further, as mentioned above, the mounting arrangement improves the shape of the flow discharge surface by eliminating obstructions such as are presented by the bolts or nuts of prior art constructions. More generally, the improvements provided by the mounting arrangement of the invention substantially lengthen the useful life of the aerator and substantially reduce repair costs and downtime.

Other features and advantages of the invention will be set forth in, or apparent from, the detailed description of a preferred embodiment which follows.

DESCRIPTION OF THE PREFERRED EMBODIMENT

Figure 1:
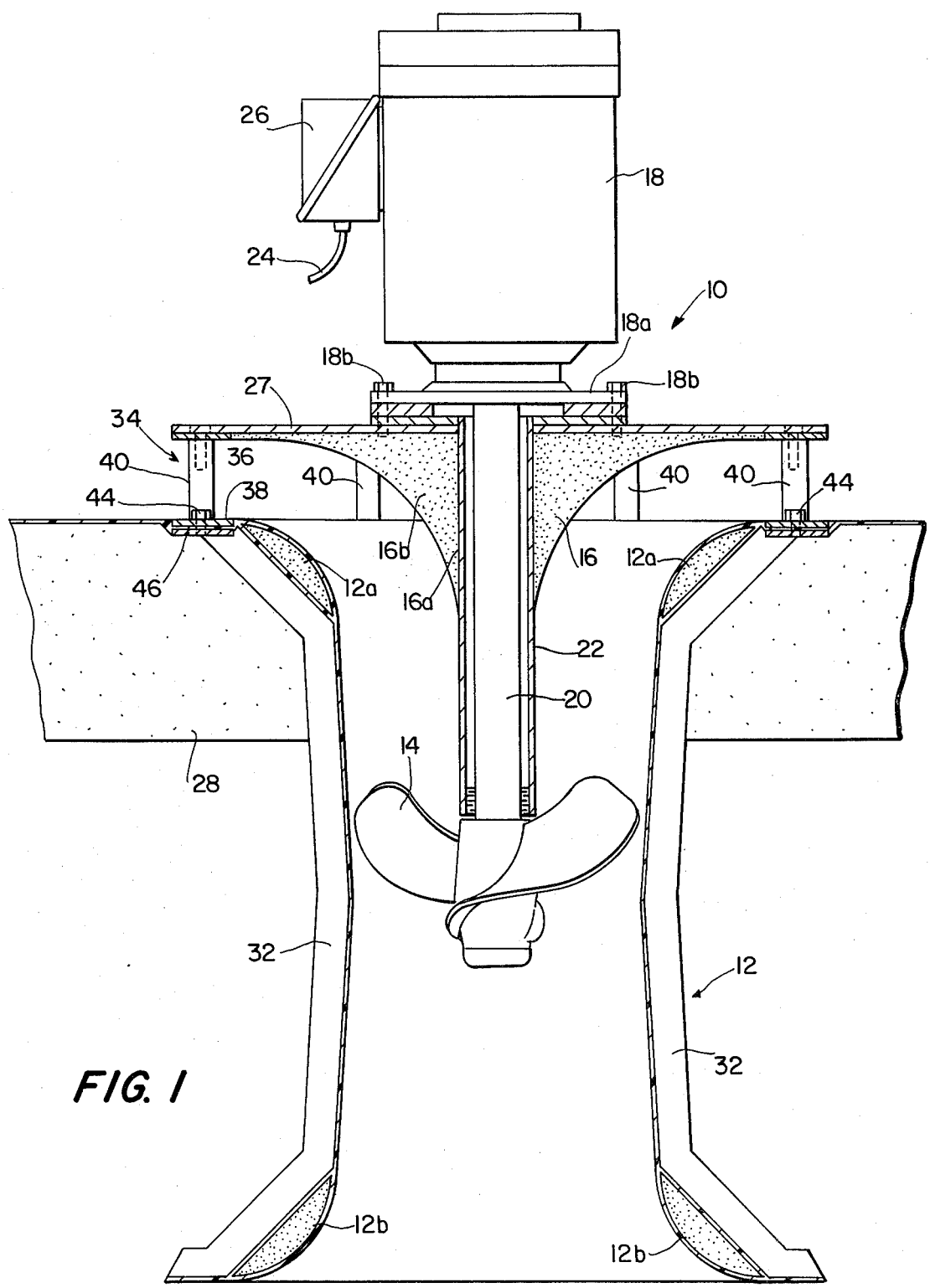
FIG. 1 is a side elevational view, partially in cross section, of a preferred embodiment of the surface aerator apparatus of the invention.

Referring to FIG. 1, a floating aerator is illustrated which incorporates the mounting arrangement of the invention. The floating aerator, which is generally denoted 10, includes an upright throat section or draft tube 12 in which a propeller or impeller 14 is disposed for pumping liquid upwardly through throat 12, a generally conical deflector or diffuser section 16 mounted at the upper end of throat 12, and a motor 18 mounted above the deflector 16. Motor 18 is connected to propeller 14 by a drive shaft 20 which extends downwardly through a cylindrical protective casing 22 disposed in an aperture 16a in deflector 16. Power for energizing motor 18 is supplied through a cable 24 connected to a connector box 26 located on the side of motor 18. Motor 18 includes a lower mounting base or plate 18a which is bolted to a support plate 27 of deflector section 16 by bolts 18b. The mounting for motor 18 on deflector 16 may include further washers and the like, as illustrated, and other mounting arrangements can, of course, be employed.

The aerator apparatus is supported by a float 28 which encircles and is secured to throat section 12. Together, the float 28 and throat section 16 constitute a float unit while the motor 18, drive shaft 20, propeller 22 and deflector section 16 generally constitute what has been referred to elsewhere as the power module. Float 28 is preferably constructed of polyurethane foam having a fiberglass outer skin indicated at 30. Throat section 12 preferably includes a plurality of encapsulated steel reinforcing ribs 32 located about the periphery thereof which provide strengthening of the throat section. The throat section is provided with upper and lower curved fillets or radii 16a and 12a which are preferably formed by a sand/resin mixture and serve to enhance the liquid flow pattern. The deflector section 16 includes a generally conical portion 12b which serves a purpose similar to that of fillets 12a, 12b and is of a similar construction.

Figure 2:
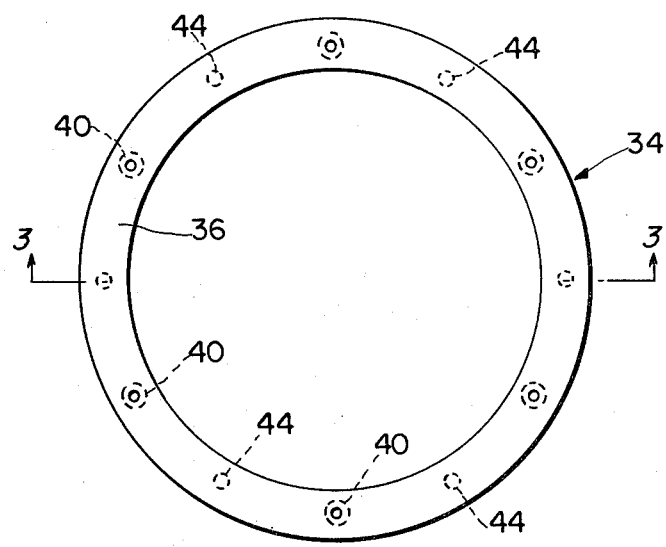
FIGS. 2 and 3 are a plan view and side elevational view, respectively, of the mounting ring unit of FIG. 1.
Figure 3:
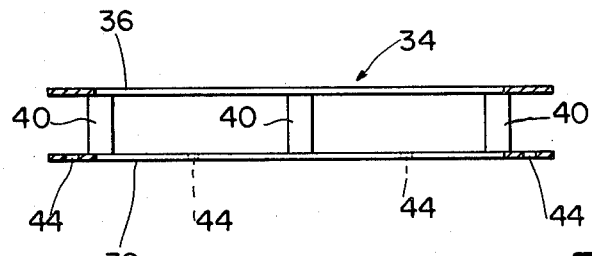
Figure 4:
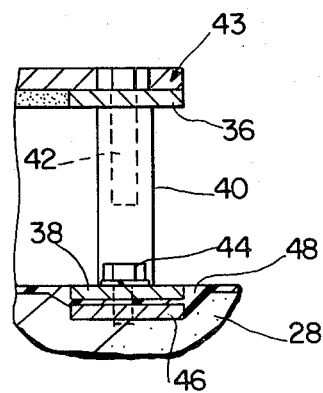
FIG. 4 is a detail, partially in cross section, showing the connection of the mounting ring unit to the power module and float unit.

The power module, i.e., the deflector section 16 and the motor 18 supported thereby, is mounted on float 28 by a mounting ring construction constructed in accordance with the present invention and generally denoted 34. Referring to FIGS. 2 and 3 in addition to FIG. 1, mounting ring construction 34 includes an upper ring or annular plate 36 which engages the periphery of deflector 16, a lower ring or annular plate 38 which rests on and is embedded in float 28 and a plurality of support rods 40 which extend between the two rings 36, 38 and are equally spaced about the circumference of the rings as shown in FIGS. 2 and 3. Rods 40 are preferably welded to the upper and lower annular plates 36 and 38 to form an integral, rigid construction. The upper ends of rods 40 and associated portions of rings 36 are drilled and tapped so as to receive bolts 42 therein as can be best seen in FIG. 4, bolts 42 serving to secure mounting ring construction to deflector section 16. As shown in FIG. 4, the heads of bolts 42 are flush with the upper surface of deflector section 16 and are encapsulated as indicated at 43 to reduce vibration. The lower ring or annulus 38 has a plurality of holes 44 drilled therethrough at equally spaced locations around the periphery thereof as can best perhaps be seen in FIGS. 2 and 3, holes 44 being equally spaced from adjacent rods 40 as shown. Holes 44 receive bolts 46 which serve to affix lower ring 38 to a steel support ring 46 embedded and encapsulated in float 28 (see FIGS. 1 and 4). In fact, both lower ring 38 and support ring 38 are received and encapsulated in float 28 as indicated by encapsulation 48 so as to present a smooth profile. Thus, only the heads of bolts 44 interrupt this profile and the obstruction provided by these bolt heads is negligible.

Although the invention has been described in relation to an exemplary embodiment thereof, it will be understood by those skilled in the art that variations and modifications can be effected in this exemplary embodiment without departing from the scope and spirit of the invention.

I claim:

1. A surface aerator apparatus comprising an upright throat section the lower end of which, in use, is immersed in the body of liquid to be aerated; a float for supporting said throat section so as to form a throat section-float combination, said float being adapted to be buoyantly supported on the body of liquid and having a vertically extending opening through which said throat section extends; an impeller located in said throat section; a drive shaft connected to said impeller for driving said impeller so as to pump liquid upwardly through said throat section for discharge therefrom; a fixed deflector section mounted above the said throat section for laterally deflecting liquid pumped up through said throat section and including a support plate and a separate integral curved wall portion against which the liquid impinges, drive means mounted on said deflector section and connected to said drive shaft, said drive means comprising a drive motor including a mounting base; and a mounting means for supporting said deflector section, said drive means, said drive shaft, and said impeller in fixed, spaced relationship relative to said throat section-float combination, said mounting means comprising a mounting ring construction comprising the integral combination of an upper ring connected to said support plate, a lower ring affixed to said throat section-float combination and a plurality of upright support rods extending between said upper and lower rings so as to support the rings in spaced relationship, said rods being disposed in spaced relationship around the circumference of the rings so as to define a plurality of openings therebetween through which, in use, liquid pumped upwardly through the throat section is discharged, bolt means for bolting said support plate to said mounting ring construction, said bolt means comprising a plurality of bolts which extend through said support plate into said support rods of said mounting ring construction and further bolt means for bolting said mounting base of said drive motor to said support plate.

2. A surface aerator apparatus as claimed in claim 1, wherein said bolts lie flush with the upper surface of the deflector.

3. A surface aerator apparatus as claimed in claim 1 or claim 2, wherein said lower ring includes a plurality of apertures therein, said apparatus further including a like plurality of bolts which extend through said apertures so as to affix said lower ring to said throat section-float combination.

4. A surface aerator apparatus as claimed in claim 3, further comprising a support ring, embedded and encapsulated in said throat section-float combination beneath said lower ring, in which said bolts for said lower ring are received.

5. A surface aerator apparatus as claimed in claim 1, wherein the upper ring is disposed so as to be flush with the wall surface of the deflector section.

6. A surface aerator apparatus as claimed in claim 5, wherein the upper ends of said bolts being at least flush with the upper surface of said support plate.

7. A surface aerator apparatus as claimed in claim 1, wherein said lower ring includes a plurality of apertures therein, said apparatus further including a like plurality of bolts received in said apertures for securing said lower ring to said throat section-float combination.

8. A surface aerator apparatus comprising a float unit including a throat section, and a power module including a drive motor having a mounting base and a propellor for pumping water upwardly through the throat section of the float unit, a fixed deflector section, disposed above said throat section for laterally deflecting liquid pumped upwardly through said throat section, said deflector section including a curved wall surface against which said liquid impinges and an integral upper support plate on which said motor is mounted, the mounting base of said motor being bolted to said support base and the periphery of said support plate extending substantially beyond the periphery of the support base of the motor and said apparatus further comprising a mounting ring construction comprising the integral combination of an upper ring secured to the support plate of said deflector section, a lower ring secured to the float unit and a plurality of circumferentially spaced connector members which extend between said upper and lower rings, said upper ring being disposed relative to said deflector section so as to be flush with and form a continuation of said curved surface.

9. A surface aerator apparatus as claimed in claim 8, wherein a first plurality of bolts are provided for securing said upper ring to said power module and a further plurality of bolts are provided for securing to lower ring to said float unit, said first plurality of bolts extending into said rods and said second plurality of bolts extending into said float unit through circumferentially spaced apertures in said lower ring.

10. A surface aerator apparatus as claimed in claim 9 wherein the heads of said first plurality of bolts are encapsulated so as to present a smooth profile and the portion of said deflector section defining said curved wall surface is fabricated of a different material from said support plate.

* * * * *